(12) United States Patent
Zink (10) Patent No.: US 8,887,343 B2
(45) Date of Patent: Nov. 18, 2014

(54) SYSTEM FOR PROPELLING A COIL CLAD HOSE AND METHOD THEREOF

(75) Inventor: Gerald P. Zink, Durango, CO (US)

(73) Assignee: Stoneage, Inc., Durango, CO (US)

( * ) Notice: Subject to any disclaimer, the term of this patent is extended or adjusted under 35 U.S.C. 154(b) by 992 days.

(21) Appl. No.: 12/723,410

(22) Filed: Mar. 12, 2010

(65) Prior Publication Data

US 2011/0220700 A1 Sep. 15, 2011

(51) Int. Cl.
| B08B 9/043 | (2006.01) |
| F16H 25/24 | (2006.01) |
| B08B 9/045 | (2006.01) |
| F16H 25/22 | (2006.01) |

(52) U.S. Cl.
CPC ............ *B08B 9/0433* (2013.01); *B08B 9/045* (2013.01); *F16H 25/2427* (2013.01); *F16H 25/2247* (2013.01)
USPC ............. 15/104.33; 15/104.095; 74/89.34; 74/424.77; 74/424.91; 134/166 C (58) Field of Classification Search
CPC ............ B08B 9/027–9/047; F16H 25/2247; F16H 25/2427
USPC ............ 15/104.33, 104.09, 104.095, 104.31; 134/166 R–181; 138/121, 122, 109; 74/89.34, 424.77, 424.91–424.96
See application file for complete search history.

(56) References Cited

U.S. PATENT DOCUMENTS

| 438,356 A | 10/1890 | MoEnany |
| 1,249,038 A | 12/1917 | Dabney |
| 2,166,448 A | 7/1939 | Schuknecht et al. |
| 2,346,728 A | 4/1944 | Carlson |
| 2,540,203 A | 2/1951 | Hatcher, Sr. |
| 2,769,191 A | 11/1956 | Hunt et al. |
| 2,807,502 A | 9/1957 | Tharp |
| 2,894,536 A | 7/1959 | Arnot |
| 2,960,851 A * | 11/1960 | Ciaccio ..................... 464/57 |
| 3,025,547 A * | 3/1962 | Ciaccio ................. 15/104.33 |
| 3,224,024 A | 12/1965 | Hunt |
| 3,329,044 A * | 7/1967 | Singer ..................... 81/424.5 |
| 3,370,599 A * | 2/1968 | Ciaccio ................... 134/167 C |
| 3,673,029 A | 6/1972 | McLarty |
| 3,882,565 A | 5/1975 | Irwin et al. |
| 4,153,966 A | 5/1979 | Irwin |
| 4,312,679 A | 1/1982 | Klein, Sr. |
| 4,349,284 A * | 9/1982 | Andersson ................ 400/320 |
| 4,395,791 A | 8/1983 | Irwin |
| 4,420,852 A * | 12/1983 | Bowlsby ................ 15/104.33 |
| 4,440,038 A * | 4/1984 | Potter ..................... 74/424.93 |
| 4,580,306 A | 4/1986 | Irwin |

(Continued)

*Primary Examiner* — Sang Kim
*Assistant Examiner* — Scott Haugland
(74) *Attorney, Agent, or Firm* — Greenberg Traurig, LLP (57) ABSTRACT

A system and method for propelling a hose, including: a system housing and a tractor element disposed in the housing. The tractor element includes: a tractor housing with a through-bore; and a protrusion extending into the through-bore. The system includes: a hose assembly including a substantially helical coil disposed about a hose; and an actuator for rotating the tractor housing with respect to the system housing. The tractor element is fixed in the system housing with respect to axial movement; and the hose assembly can be disposed in the through-bore so that the protrusion contacts a portion of the coil. As the tractor housing is rotated in a rotational direction: the protrusion exerts a displacement force on the coil; and the hose assembly reacts to the displacement force by displacing in an axial direction.

17 Claims, 9 Drawing Sheets

(56) References Cited

U.S. PATENT DOCUMENTS

| | | | |
|---|---|---|---|
| 4,589,447 A | 5/1986 | Kane et al. | |
| 4,602,808 A | 7/1986 | Herron et al. | |
| 4,686,732 A | 8/1987 | Irwin | |
| 4,947,698 A | 8/1990 | Dodds et al. | |
| 5,193,242 A * | 3/1993 | Irwin | 15/104.33 |
| RE34,585 E * | 4/1994 | Schmidt et al. | 134/167 C |
| 5,482,089 A | 1/1996 | Weber et al. | |
| 5,500,974 A * | 3/1996 | Wu | 15/104.33 |
| 5,762,108 A | 6/1998 | Hunter | |
| 5,901,401 A | 5/1999 | Rutkowski et al. | |
| 5,933,903 A * | 8/1999 | Irwin | 15/104.33 |
| 5,988,226 A | 11/1999 | Matthews | |
| 6,076,219 A * | 6/2000 | Irwin | 15/104.33 |
| 6,081,050 A | 6/2000 | Hong et al. | |
| 6,193,282 B1 | 2/2001 | Assenheimer | |
| 6,360,397 B1 | 3/2002 | Babb | |
| 6,412,136 B1 | 7/2002 | Rutkowski | |
| 6,604,758 B1 | 8/2003 | Assenheimer | |
| 6,655,228 B1 | 12/2003 | Margherio et al. | |
| 7,478,451 B2 | 1/2009 | Rutkowski et al. | |
| 2006/0117888 A1 | 6/2006 | Tsubono et al. | |
| 2009/0133771 A1 | 5/2009 | He | |

* cited by examiner

SYSTEM FOR PROPELLING A COIL CLAD HOSE AND METHOD THEREOF

FIELD OF THE INVENTION

The invention relates generally to a system and method for propelling a hose and coil assembly. The invention also relates to: a device for propelling a hose and coil assembly; a hose and coil assembly; and a fitting. The invention further relates generally to a method for assembling a hose and coil assembly, and a method for assembling a hose, coil, and fitting assembly.

BACKGROUND OF THE INVENTION

It is known to axially displace a coil or wire by rotating the coil or wire, having an outer circumference of the rotating coil or wire engage with rollers or similar elements, and using the engagement of the outer circumference with the rollers or similar elements to translate the rotation of the coil or wire into axial displacement of the coil or wire. For example, such an arrangement is disclosed in U.S. Pat. Nos. 4,686,732; 4,580,306; 4,395,791; 4,153,966; and 3,882,565 (Irwin, Lawrence F.)

It also is known to rotate an element in frictional engagement with an outer circumference of a coil or wire to axially displace the coil or wire, for example, as taught by U.S. Pat. No. 2,346,728 (Carlson, Emil).

It is further known to linearly displace a rack rod by revolving rollers, in contact with the rod, about an outer peripheral surface of the rod. Grooves in the rollers mesh with a thread for the rod. Such an arrangement is taught by U.S. Patent Application Publication No. 2006/0117888 (Tsubono, Isamu et al.).

SUMMARY OF THE INVENTION

According to aspects illustrated herein, there is provided a system for propelling a hose, including: a system housing; and a tractor element disposed in the housing. The tractor element includes: a tractor housing with a through-bore; and a protrusion extending into the through-bore. The system includes: a hose assembly including a substantially helical coil disposed about a hose; and an actuator for rotating the tractor housing with respect to the system housing. The tractor element is fixed in the system housing with respect to axial movement; the hose assembly can be disposed in the through-bore so that the protrusion contacts a portion of the coil; and as the tractor housing is rotated by the actuator in a rotational direction: the protrusion exerts a displacement force on the coil; and the hose assembly reacts to the displacement force by displacing in an axial direction.

According to aspects illustrated herein, there is provided a method for propelling a hose, including: axially fixing a tractor element within a housing; placing a hose assembly, including a hose and a substantially helical coil disposed about the hose, in a through-bore for the tractor element; contacting a portion of the coil with a protrusion extending into the through-bore; rotating the tractor element in a first rotational direction; exerting, using the protrusion, a displacement force on the coil; reacting the coil to the displacement force; and displacing the hose assembly in the first axial direction.

According to aspects illustrated herein, there is provided a tractor device for propelling a hose, including: a housing with a cylindrical through-bore; and a protrusion extending into the through-bore. A hose assembly, including a substantially helical coil disposed about a hose, is positionable within the through-bore so that the protrusion contacts a portion of the coil. The housing is rotatable in a first rotational direction so that: the protrusion applies a displacement force to the coil; and the hose assembly is displaceable in a first axial in reaction to the application of the displacement force to the coil.

According to aspects illustrated herein, there is provided a hose assembly, including: a hose including an outer surface with an outer radius; and a substantially helical coil disposed about the hose and in contact with the outer surface. In a relaxed state prior to displacement about the hose, the coil has an inner radius less than the outer radius.

According to aspects illustrated herein, there is provided a method of assembling a hose and a coil, including: for a helical coil having an first inner radius in a relaxed state, expanding the helical coil so that the helical coil has a second inner radius greater than the first inner radius; inserting, within the helical coil, a hose having an outer radius greater than the first inner radius and no greater than the second inner radius; and releasing the expansion of the helical coil so that the helical coil compressively engages the hose.

According to aspects illustrated herein, there is provided a hose fitting, including: a longitudinal axis and an outer surface that is: substantially cylindrical and including a first outer radius; or non-cylindrical and including a point at a furthest radial distance from the longitudinal axis. The fitting includes: a distal end for accepting an attachment and having a second outer radius; a first end for attaching to a hose and having a third outer radius; and a substantially helical groove in the outer surface. The groove includes a bottom surface with a fourth outer radius; and the groove is in communication with the distal end. The second, third, and fourth outer radii are substantially equal.

According to aspects illustrated herein, there is provided a method of assembling a hose, coil, and fitting, including attaching a first end of a fitting to an end of a hose, the hose including a first outer radius. The fitting includes: a longitudinal axis; a distal end longitudinally opposite the first end; an outer surface with a second outer radius; and a substantially helical groove in the outer surface. The groove includes a first opening in communication with the distal end, and a bottom surface at a radial distance from the longitudinal axis. The second outer radius is greater than the first outer radius; and the first outer radius is no greater than the radial distance. The method includes: inserting an end of the coil through the second opening and into the groove, the coil having an inner radius no less than the first outer radius; and displacing the coil through the groove onto the hose.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE PREFERRED EMBODIMENT

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should be understood that the use of "or" in the present application is with respect to a "non-exclusive" arrangement, unless stated otherwise. For example, when saying that "item x is A or B," it is understood that this can mean one of the following: 1) item x is only one or the other of A and B; and 2) item x is both A and B. Alternately stated, the word "or" is not used to define an "exclusive or" arrangement. For example, an "exclusive or" arrangement for the statement "item x is A or B" would require that x can be only one of A and B.

Figure 1A:
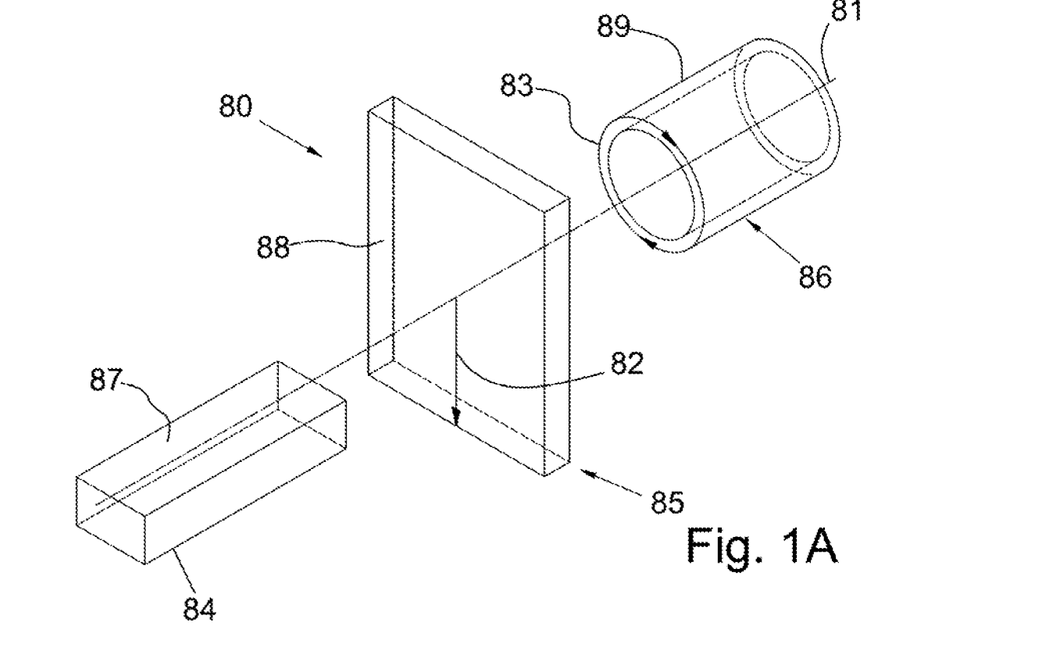
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present disclosure is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential surface. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
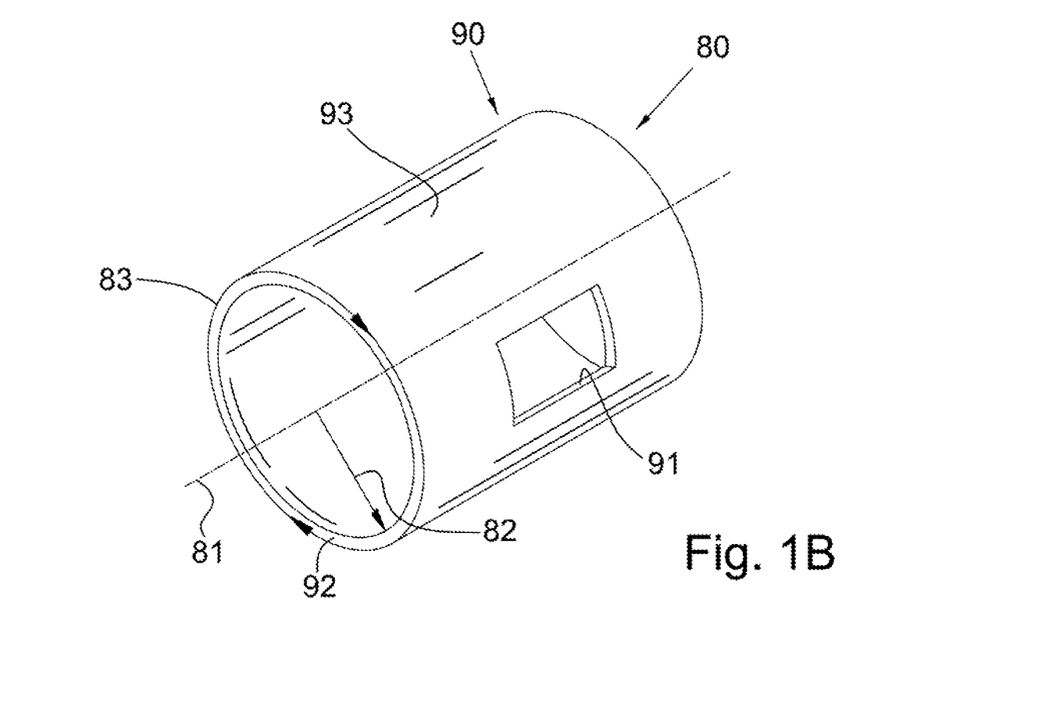
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present disclosure in any manner. Object 90 includes axial surface 91, radial surface 92, and circumferential surface 93. Surface 91 is part of an axial plane and surface 92 is part of a radial plane.

Figure 2:
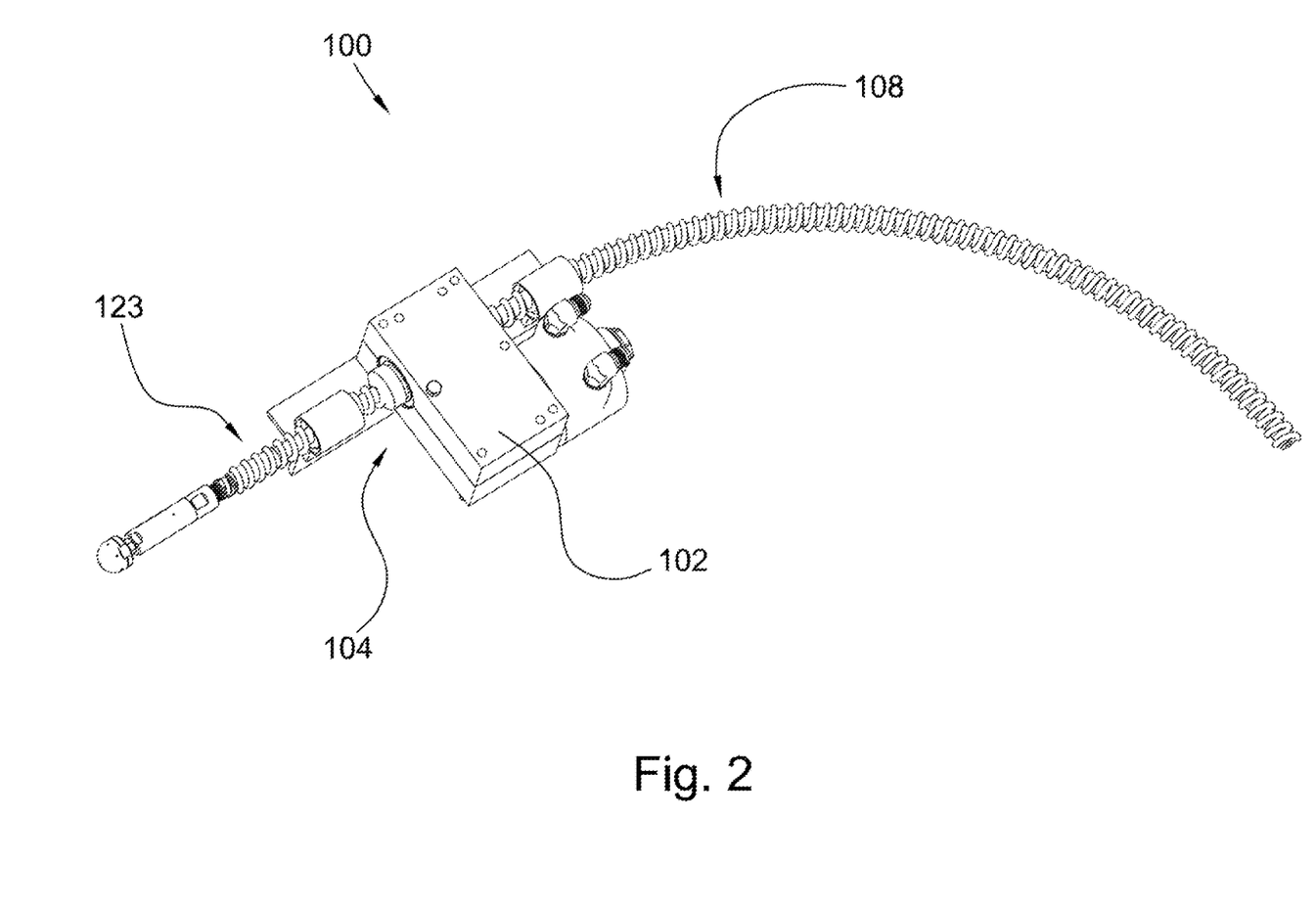
FIG. 2 is a perspective view of a system for rotating and propelling a hose.

FIG. 2 is a perspective view of system 100 for rotating and propelling a hose.

Figure 3:
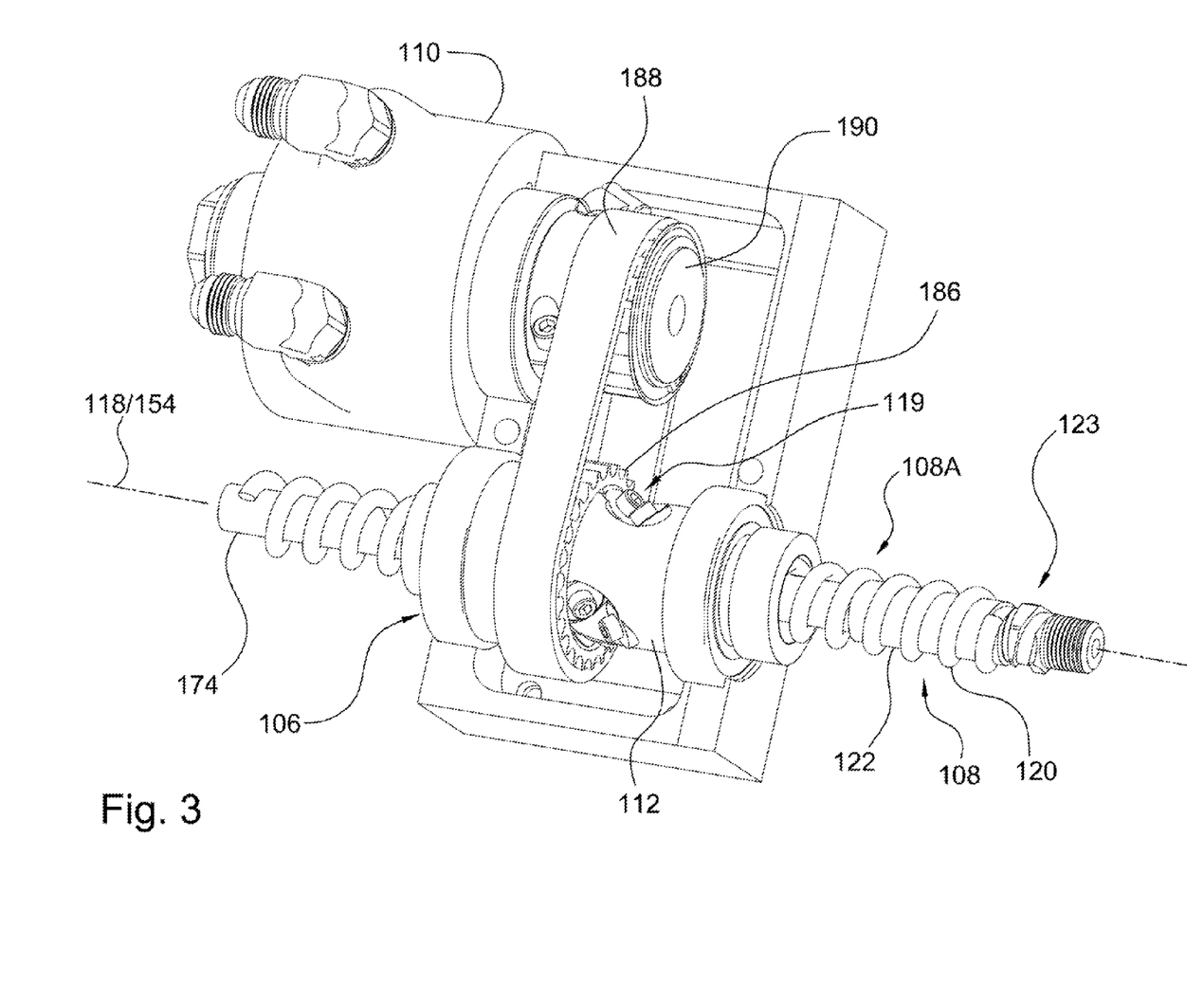
FIG. 3 is a view of the system shown in FIG. 2 with the cover for the system housing removed.

FIG. 3 is a view of system 100 shown in FIG. 2 with cover 102 for the system housing removed.

Figure 4:
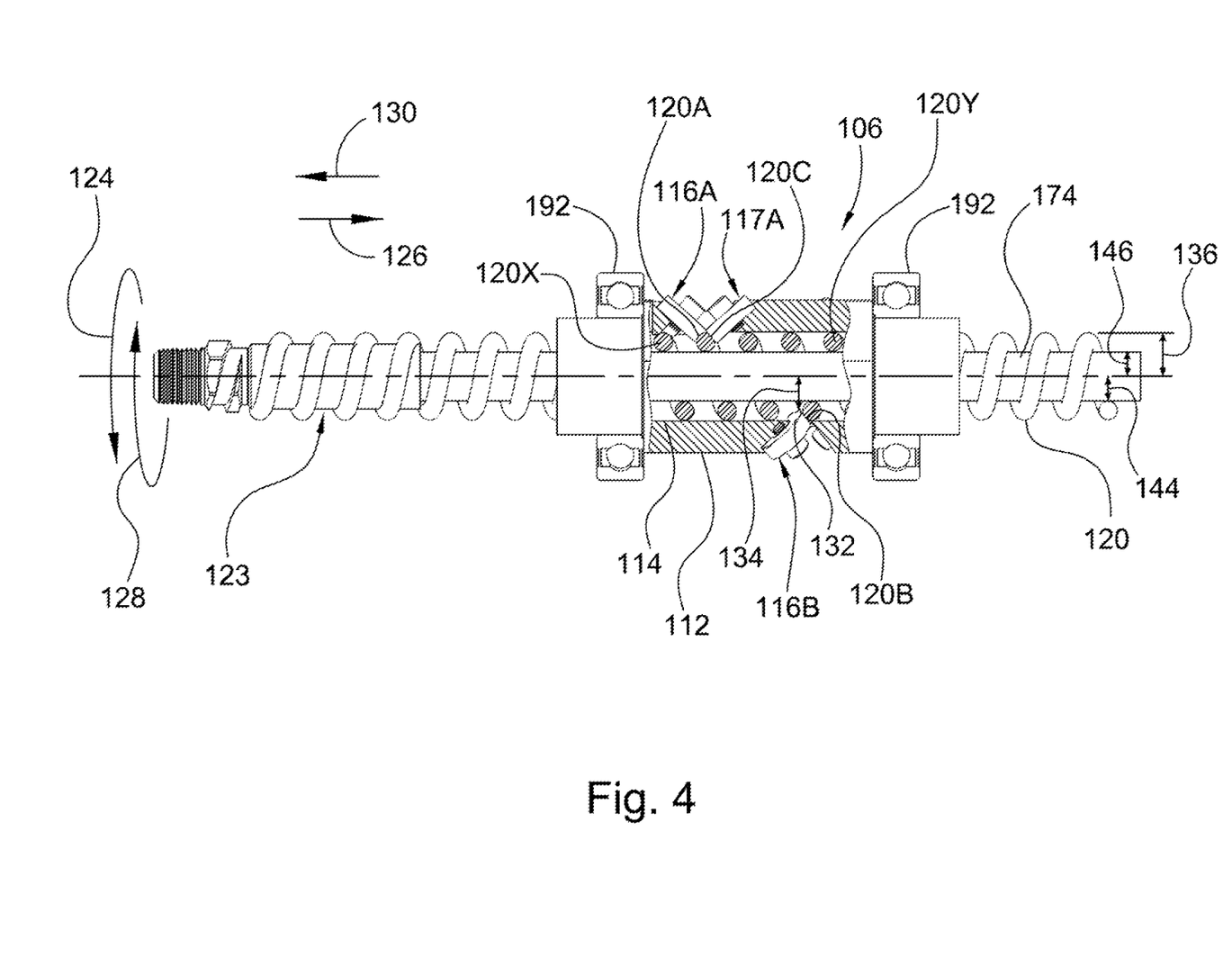
FIG. 4 is a plan view of the tractor element and hose assembly shown in FIG. 2 with a portion of the housing for the tractor element cut away.

FIG. 4 is a plan view of the tractor element and hose assembly shown in FIG. 2 with a portion of the housing for the tractor element cut away. The following should be viewed in light of FIGS. 2 through 4. System 100 includes system housing 104, tractor element 106 disposed in the housing, hose assembly 108, and actuator 110. The tractor element includes tractor housing 112 with through-bore 114 and at least one protrusion 116 extending into the through-bore and oriented in direction 126 and at least one protrusion 117 extending into the through-bore and oriented in direction 130. The tractor element is fixed in the system housing with respect to axial movement, that is, movement parallel to axis of rotation, or longitudinal axis 118 for the tractor element. The hose assembly includes substantially helical coil 120 disposed about hose 122. The actuator is for rotating the tractor housing with respect to the system housing, for example, about axis 118.

In one embodiment, the at least one protrusions 116 and 117 include respective pluralities of protrusions. In one embodiment, protrusions 116 in the plurality of protrusions 116 are radially and circumferentially misaligned and protrusions 117 in the plurality of protrusions 117 are radially and circumferentially misaligned. Stated otherwise, for example, protrusions 116 and 117, respectively, are misaligned with respect to a radius from axis 118 and protrusions 116 and 117, respectively, are misaligned with respect to a line parallel to axis 118. The "staggered" configuration acts to center the hose assembly as the assembly passes through the tractor housing and also acts to equalize the application of displacement forces on the hose assembly. In one embodiment, protrusions 116 and 117 are grouped in respective pairs of one protrusion 116 and one protrusion 117 each.

In one embodiment, protrusions 116 and 117 are symmetrically arranged. For example, protrusions 116 are equally spaced about a circumference of housing 112 and are equally spaced along axis 118, or protrusions or bearings 117 are equally spaced about a circumference of housing 112 and are equally spaced along axis 118.

In one embodiment, protrusions 116 and 117 are respective bearings, for example, rotatable about respective axis as further described infra. In one embodiment, bearings 116 and 117 are grouped in respective pairs 119 with one bearing 116 and one bearing 117 each. In the figures and in the discussion that follows, pairs 119 of bearings are shown and described for protrusions 116 and 117. It should be understood that system 100 can include any combination of protrusions and bearings.

Figures 5, 6:
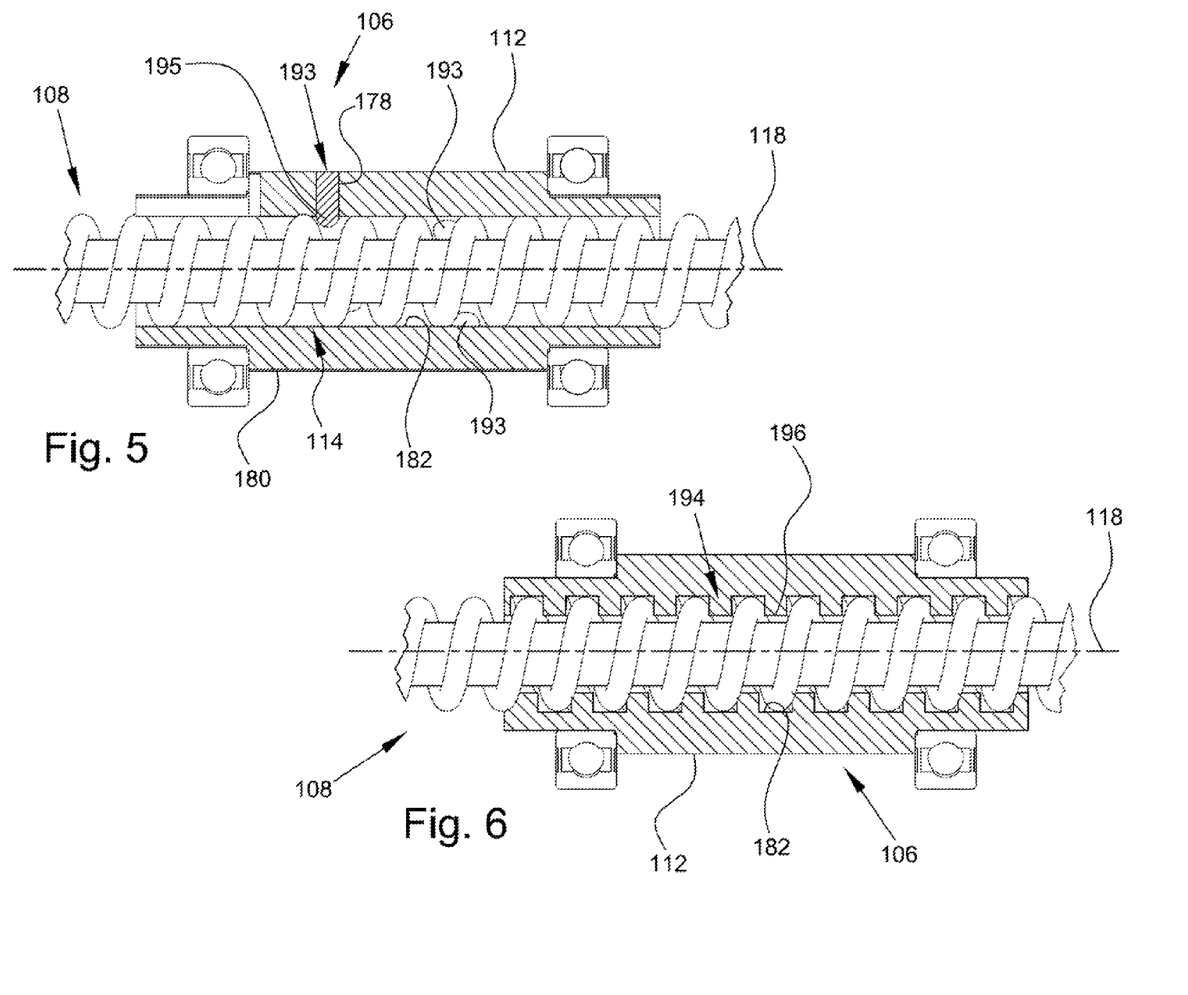
FIG. 5 is a plan view of the tractor element and hose assembly shown in FIG. 2 with a portion of the housing for the tractor element cut away and showing protrusions.
FIG. 6 is a plan view of the tractor element and hose assembly shown in FIG. 2 with a portion of the housing for the tractor element cut away and showing integral protrusions.

FIG. 5 is a plan view of the tractor element and hose assembly shown in FIG. 2 with a portion of the housing for the tractor element cut away and showing protrusions. The following should be viewed in light of FIGS. 2 through 5. In one embodiment, the tractor element includes at least one protrusion 193 extending into the through-bore and oriented substantially orthogonal to axis 118. In one embodiment, protrusion 193 is in the form of a pin or bolt. In one embodiment, protrusion 193 includes a plurality of protrusions. In one embodiment, protrusions 193 in the plurality of protrusions 193 are radially and circumferentially misaligned. Stated otherwise, for example, protrusions 193 are misaligned with respect to a radius from axis 118 and with respect to a line parallel to axis 118. The "staggered" configuration acts to center the hose assembly as the assembly passes through the tractor housing and also acts to equalize the application of displacement forces on the hose assembly.

In one embodiment, protrusions 193 are symmetrically arranged. For example, protrusions 193 are equally spaced about a circumference of housing 112 and are equally spaced along axis 118. In one embodiment, housing 112 includes at least one opening 178 between outer surface 180 of the housing and surface 182 of the through-bore and protrusions 193 are inserted through the openings to protrude into the through-bore. In one embodiment, the protrusions are fixed with respect to housing 112, for example, there is a compression fit between openings 178 and the protrusions or the protrusions are fixed by welding or other means known in the art. In one embodiment, the protrusions are insertable into and removable from openings 178. For example, the protrusions can be removed from the through-bore to enable easier passage of the hose assembly through the through-bore, for example, during initial installation of the hose assembly or removal of the hose assembly. The protrusions can be secured with respect to housing 112 to allow insertion and removal by any means known in the art, for example, complimentarily threading the protrusions and respective openings 178 or adding a fastening device, such as a nut to a portion of the protrusion extending beyond surface 180.

FIG. 6 is a plan view of the tractor element and hose assembly shown in FIG. 2 with a portion of the housing for the tractor element cut away and showing integral protrusions 194. The following should be viewed in light of FIGS. 2 through 4 and 6. In one embodiment, the tractor element includes at least one protrusion 194 integral to the tractor housing, for example, as part of surface 182. In one embodiment, protrusion 194 is helical in form, for example, similar to a female thread. A continuous thread from one end of the through-bore to the other end of the through-bore is shown for protrusion 194 in FIG. 5. However, it should be understood that protrusion 194 does not need to extend from one end of the through-bore to the other end of the through-bore, and that protrusion 194 can include two or more discontinuous segments.

Although the discussion that follows is generally directed to protrusions as bearings, it should be understood that the discussion is applicable to protrusions in general.

The following should be viewed in light of FIGS. 2 through 6. End 108A of the hose assembly is for connection to a fitting or other attachment, such as fitting 123. The hose assembly is displaceable parallel to axis 118, for example, the end of the hose opposite end 108A is not anchored with respect to axial movement. The hose assembly can be disposed in the through-bore so that a bearing 116 contacts a portion of the coil. For example, bearing 116A contacts portion 120A and bearing 116B contacts portion 120B. As the tractor housing is rotated by the actuator in rotational direction 124, bearings 116A/B exert respective displacement forces on the portions of the coil in contact with the bearings. The hose assembly reacts to the respective displacement force by displacing in axial direction 126. In like manner, protrusions 193 and 194 exert respective displacement forces on the portions of the coil in contact with protrusions 193 or 194.

The hose assembly can be disposed in the through-bore so that a bearing 117 contacts a different portion of the coil, for example, bearing 117A contacts portion 120C. As the tractor housing is rotated by the actuator in rotational direction 128, opposite direction 124, bearing 117A exerts a displacement force on the portion of the coil in contact with the bearing. The hose assembly reacts to the displacement force by displacing in axial direction 130, opposite direction 126. The interaction of the bearings and the hose assembly is further described infra.

In one embodiment, protrusions 193 are substantially orthogonal to surface 182 and a same protrusion exerts oppositely directed displacement forces on the portion of the coil in contact with the protrusion according to the direction of rotation of housing 112, causing reaction of the hose assembly in directions 126 and 130. Protrusion 194 exerts a displacement forces on the portion of the coil in contact with the protrusion according to the direction of rotation of housing 112, causing reaction of the hose assembly in directions 126 and 130.

Advantageously, bearings 116 and 117 and protrusions 193 and 194 apply a positive force directly to the coil, against which the coil reacts to displace in directions 126 and 130, rather than frictionally engaging an outer circumference of the coil along direction 126 or 130. That is, the bearings or protrusions "push" rather than "drag" the coil, resulting in a greater displacement force on the coil. Thus, the hose assembly displaces in directions 126 and 130 with much greater force than would be possible if only a frictional "dragging" force were applied to the outer circumference of the coil.

The configuration of the bearings in the through-bore enables the above-described interface with the coil. For example, respective portions 132, 195, and 196 of each bearing, protrusion 193, and protrusion 194, respectively, is located closest to the axis of rotation, that is, this is the portion that extends furthest into the bore toward the axis. For example, portions 132 are at radial distance 134 from the axis of rotation. The coil includes outer radius 136, which is greater than distance 134. Alternately stated, portions 132, 195, and 196 and the portions of the coil in contact with the bearings or protrusions, for example, portions 120A-C for the bearings, are axially aligned, and the bearings or protrusions exert the displacement force on the portions of the coil axially aligned with the bearings or protrusions. Hence, portions 132, 195, and 196 and the coil overlap in the axial directions and the bearings or protrusions are able to push directly on the coil to apply the respective displacement forces to the coil.

Figure 7:
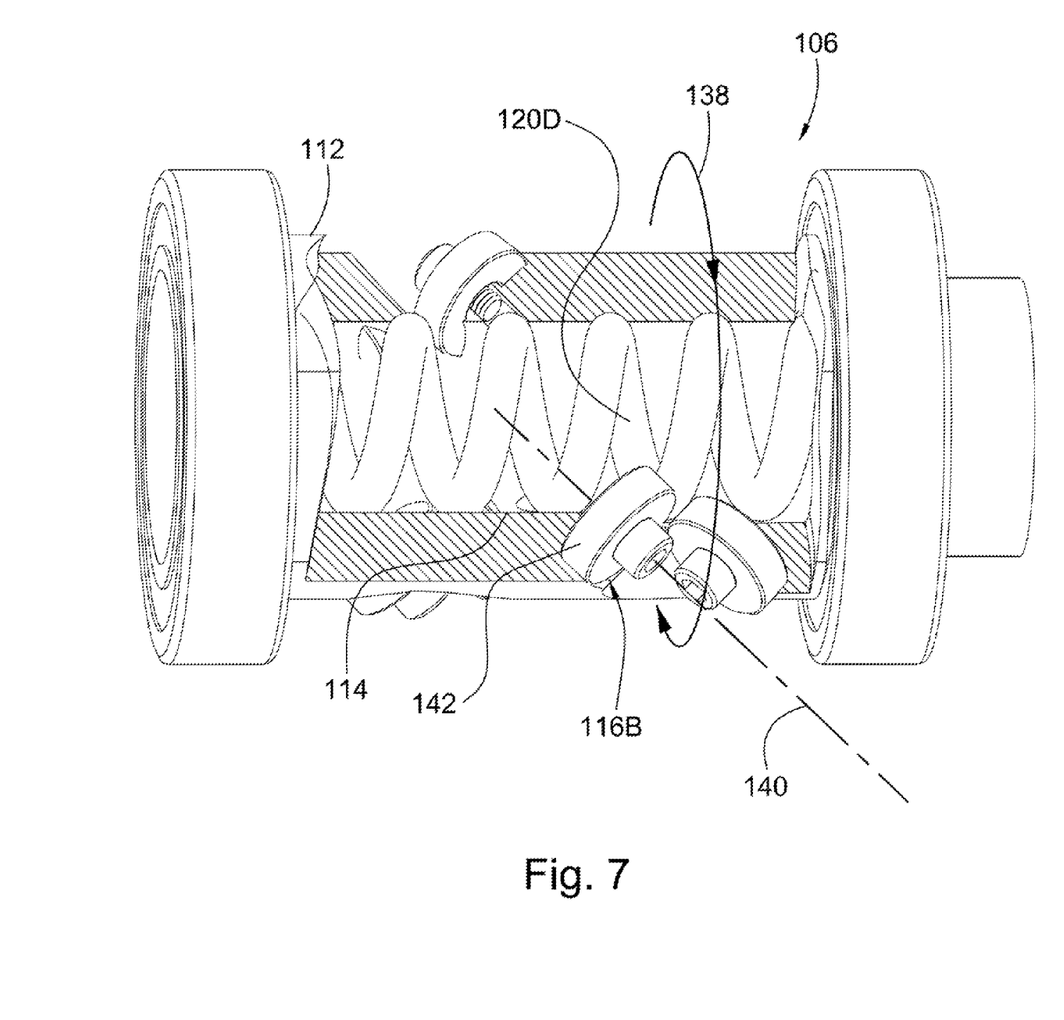
FIG. 7 is a perspective view of the tractor element and hose assembly shown in FIG. 2 with a portion of the housing for the tractor element cut away and the hose removed.

FIG. 7 is a perspective view of the tractor element and hose assembly shown in FIG. 2 with a portion of the housing for the tractor element cut away and the hose removed. The following should be viewed in light of FIGS. 4, 5, and 7. The axially fixed rotation of the bearings with respect to the hose assembly enables displacement of the hose in response to the displacement forces. For example, bearings 116 and 117 and protrusions 193 displace, or rotate, in respective circular paths, for example, paths 138 for the bearings about axis 118. Since the tractor element is axially fixed with respect to the system housing, the circular paths also are axially fixed with respect to the system housing. For example, as respective portions 132 and 195 rotate about the axis, the paths/portions remain fixed in the axial directions. The coil, however, is substantially helical in shape and therefore the coil continually "unwinds" in the axial directions. For example, as one follows the coil from point 120X to point 120Y in FIG. 4, the coil continuously cuts across lines, such as paths 138, orthogonal to axis 118.

Thus, as the bearings or protrusions continue to traverse the respective axially fixed circular paths, the bearings or protrusions apply the respective displacement forces to the portions of the coil cutting across the circular paths. For example, as seen in FIG. 7, segment 120D of the coil moves away from contact point 120B toward point 120X. Thus, segment 120D moves progressively further out of radial alignment with portion 132 of bearing 116B. As bearing 116B moves along path 138 (in direction 124), segment 120D of the coil is in path 138, and coil 120, which is free to move in the axial directions must move "out of the way" of bearing 116B so that the bearing can continue movement in axially fixed path 138. In other words, bearing 116B cannot move in the axial directions, the displacement force applied by the bearing to the coil by the rotation of the bearing is greater than the resistance of the hose assembly to axial movement, and the coil is forced to react to the displacement force being applied along path 138 by the bearing by displacing in direction 126 to relieve the pressure from the bearing. Thus, the displacement of the coil is in reaction to continued respective movements of the bearings in the respective circular paths. The preceding also is applicable to protrusions 193.

In one embodiment, the interaction of the bearings and the coil is further facilitated by the rotation of the bearings about their respective axes. For example, as bearing 116B rotates along path 138 in FIG. 5, the bearing rotates about axis 140 and the coil rolls along outer circumferential surface 142 of the bearing, pushing the coil in direction 126. Thus, the coil is able to smoothly translate in the axial directions and with nominal frictional engagement with the bearings. The above discussion also is applicable to rotation of the tractor element in direction 128.

The following should be viewed in light of FIGS. 2-7. In one embodiment, the coil is disposed about the hose, but in general is not in contact with the hose. That is, inner radius 144 of the coil is greater than outer radius 146 of the hose. Some nominal contact is possible between the hose and the coil. In one embodiment, the coil is in contact with the hose. For example, the coil, in a relaxed state, has inner radius 144 no greater than outer radius 146 of the hose. In one embodiment, the coil is in compressive engagement with the hose. For example, the coil, in a relaxed state, has an inner radius 144 less than outer radius 146. Further detail regarding coil 120 and hose 122 is provided infra.

Figures 8, 9:
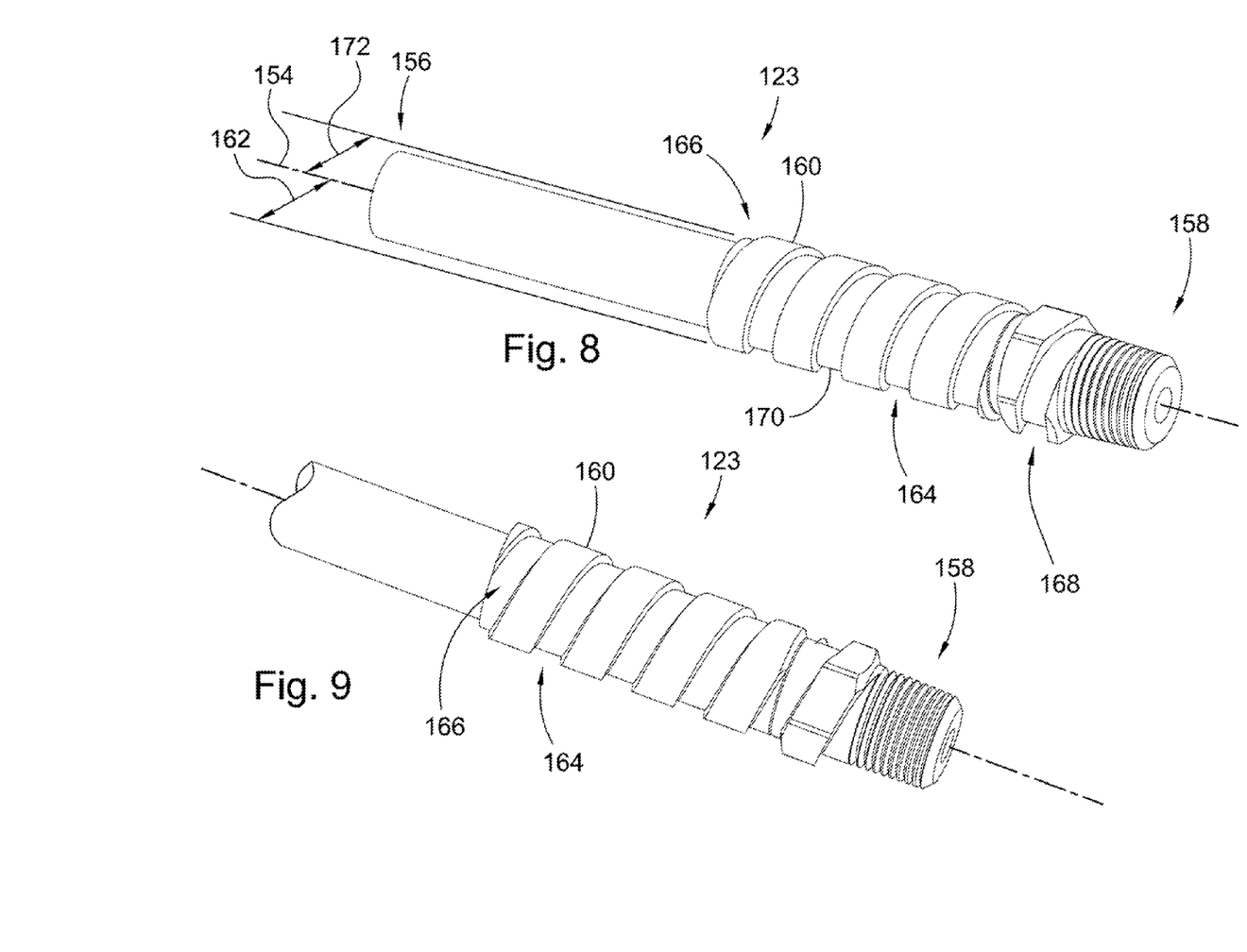
FIG. 8 is a perspective view of the fitting shown in FIG. 2 showing a groove opening at a distal end.
FIG. 9 is a perspective view of the fitting shown in FIG. 2 showing a groove opening opposite a distal end.

FIG. 8 is a perspective view of the fitting shown in FIG. 2 showing a groove opening at a distal end.

FIG. 9 is a perspective view of the fitting shown in FIG. 2 showing a groove opening opposite a distal end. The following should be viewed in light of FIGS. 2 through 9. In one embodiment, the hose assembly includes fitting 123 attached to end 108A of the hose assembly. The fitting includes longitudinal axis 154 co-linear with axis 118, end 156 connected to the hose and distal end 158 longitudinally opposite end 156. The fitting also includes outer surface 160 with outer radius 162 and substantially helical groove 164 in outer surface 160. In one embodiment, the helical groove is open at ends 156 and 158, for example, the groove includes ends 166 and 168 opening to ends 156 and 158, respectively. The groove bottom surface 170 is at radial distance 172 from the longitudinal axis. The hose includes outer surface 174 with outer radius 146.

In one embodiment, outer radius 162 is greater than outer radius 146 and outer radius 146 is no greater than radial distance 172. In one embodiment, radius 146 is less than radial distance 172. In one embodiment, radius 146 and radial distance 172 are substantially equal. In one embodiment, the coil is displaceable through the groove onto the hose while the fitting is fixed to the hose. In one embodiment, the coil fills all of groove 164, for example, the coil is in place from ends 166 to 168 of the groove. In one embodiment, the coil extends only part way in the groove from end 166 to end 168. Frictional and/or compressive contact between the coil and surface 170 helps maintain the position of the coil in the groove. In one embodiment, a portion of the coil in contact with surface 170 is flattened to maximize the area of the coil frictionally and/or compressively engaged with surface 170, which increases the forces maintaining the position of the coil within the groove. In one embodiment, a portion of the coil in contact with surface 170 is flattened to ensure that outer radius 136 is at a desired value, for example, radius 136 is not so large as to cause interference the coil and the through-bore as the coil passes through the through-bore. In one embodiment, the coil, in a relaxed state, has inner radius 144 no greater than outer radius 146 and the coil is displaceable through the groove onto the hose while the fitting is fixed to the hose. In one embodiment, the coil, in a relaxed state, has inner radius 144 less than outer radius 146 and the coil is displaceable through the groove onto the hose while the fitting is fixed to the hose.

Advantageously, since the groove is open at the distal end, the coil can be displaced through the groove onto or about the hose while the fitting is attached to the hose. Attaching a fitting to a hose, in particular, a high pressure hose, is a precise and demanding operation that is often best done by the hose manufacturer or distributor. Advantageously, the fitting can be supplied by an entity, for example, making or using system 100, to the hose manufacturer/distributor, the hose manufacturer/distributor can connect the fitting to the hose, and the hose manufacturer/distributor can ship the hose/fitting assembly back to the entity. The entity then can insert the coil on or about the hose through the groove in the fitting.

Otherwise, using a fitting without a groove having an opening at a distal end of the fitting, the coil must be placed about a hose by an entity, the bulkier combination of the hose and coil must be sent to the hose manufacturer/distributor at a greater shipping cost, the hose manufacturer/distributor must work with the bulkier combination of the hose and coil to attach the fitting to the combination, increasing cost and complexity for this attachment process, and finally, the hose manufacturer/distributor must ship, at greater cost, the bulkier combination of the hose, coil and attached fitting back to the entity. In other words, using a fitting such as fitting 123, shipping and hose/fitting operations can be more easily and less expensively performed by eliminating the coil from these operations. Alternatively, the groove in the fitting can be cut (milled) after the hose is assembled and before the coil is installed.

Figure 10:
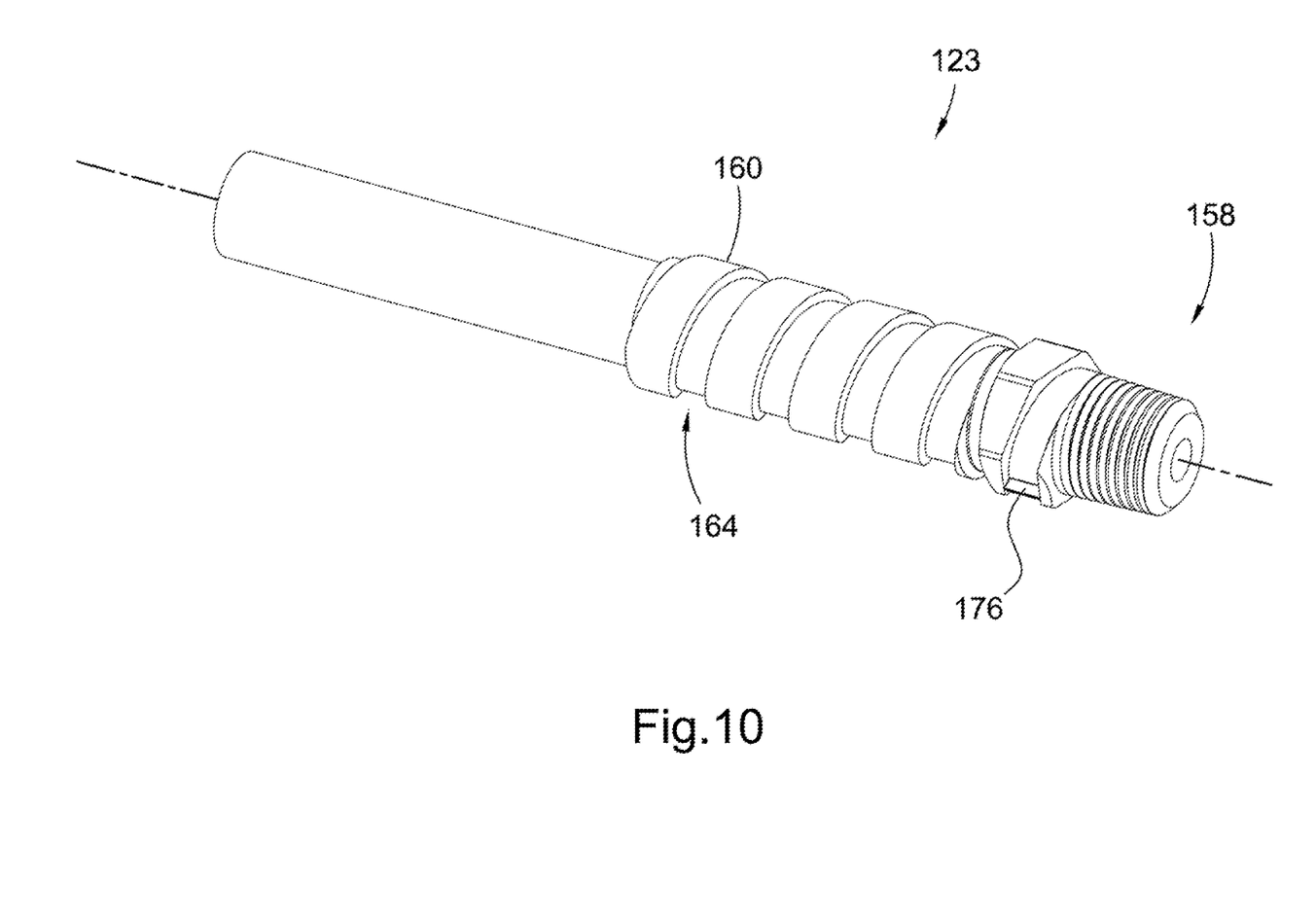
FIG. 10 is a perspective view of a fitting usable with the system shown in FIG. 2; and, FIG. 11 is a plan view of the tractor element shown in FIG. 2 with a portion of the housing for the tractor element cut away.

FIG. 10 is a perspective view of a fitting usable with the system shown in FIG. 2. The following should be viewed in light of FIGS. 2 through 10. In FIG. 10, fitting 123 is substantially the same as fitting 123 in FIGS. 8 and 9 with the exception of end wall 176 at the distal end of the groove. Instead of groove 164 opening to end 168, end wall 176 blocks the groove at end 168. The coil engages the end wall to help secure the coil to the fitting. In one embodiment, the coil is expandable so that inner radius 144 is greater than or equal to outer radius 162 and the expanded coil can be passed over the fitting and about the hose while the fitting is fixed to the hose. Once the coil is in place, the expansion of the coil is released.

In one embodiment, the coil fills all of groove 164, for example, the coil is in place from ends 166 to 168 of the groove. In one embodiment, the coil extends only part way in the groove from end 166 to end 168. Frictional and/or compressive contact between the coil and surface 170 helps maintain the position of the coil in the groove. In one embodiment, a portion of the coil in contact with surface 170 is flattened to maximize the area of the coil frictionally and/or compressively engaged with surface 170, which increases the forces maintaining the position of the coil within the groove. In one embodiment, a portion of the coil in contact with surface 170 is flattened to ensure that outer radius 136 is at a desired value, for example, radius 136 is not so large as to cause interference the coil and the through-bore as the coil passes through the through-bore. When the coil extends substantially through the groove to the distal end, the hose is protected from kinking where the coil is inserted into the fitting. As described above, an end wall can be used near the distal end of the fitting to maintain the coil position.

Figure 11:
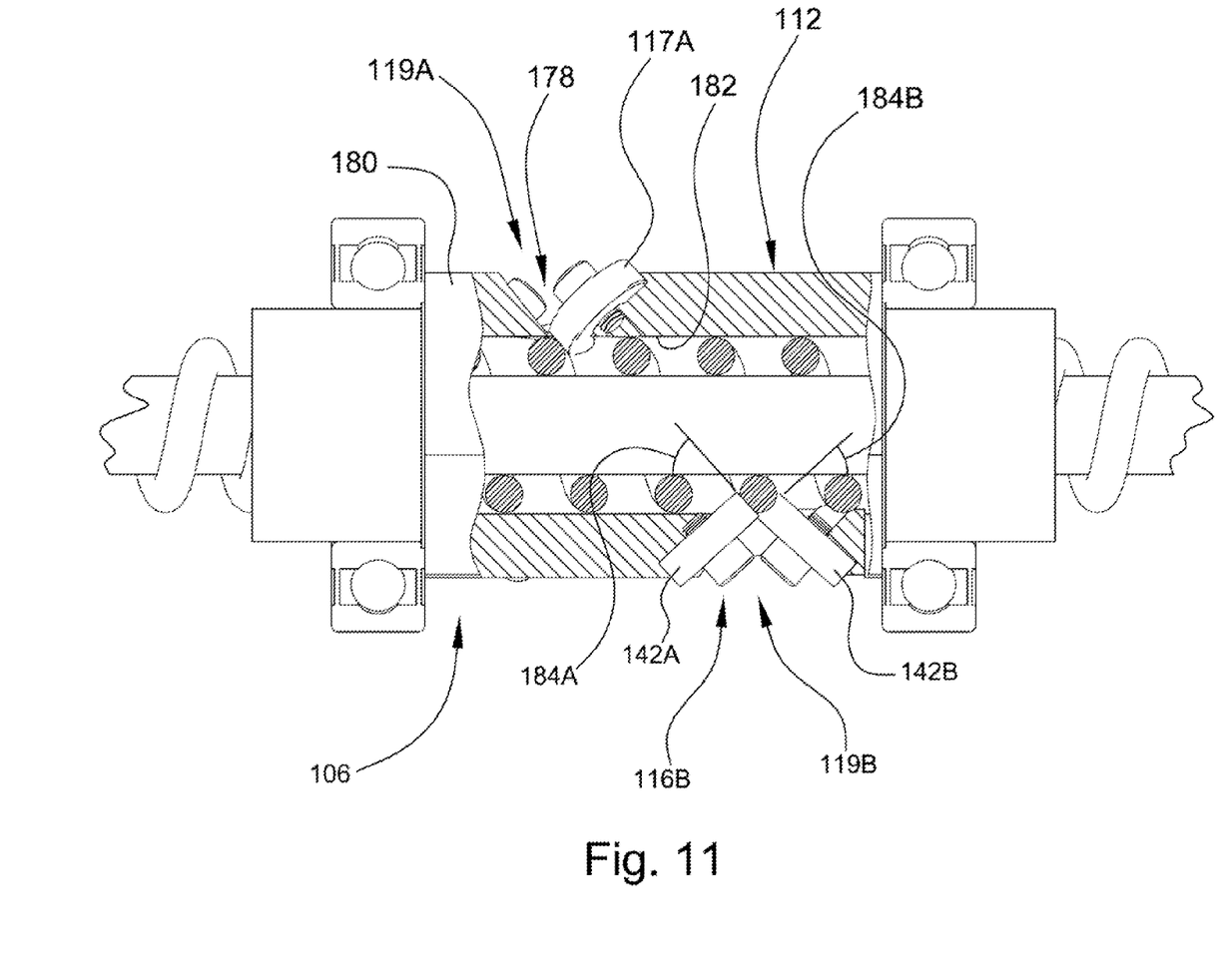

FIG. 11 is a plan view of the tractor element shown in FIG. 2 with a portion of the housing for the tractor element cut away. In FIG. 11, the coil in the cut-away portion is sectioned and the hose is not sectioned. The following should be viewed in light of FIGS. 2 through 4, 7, and 9. In one embodiment, housing 112 includes at least one opening 178 between outer surface 180 of the housing and surface 182 of the through-bore. In one embodiment, each bearing 116 and 117 is at least partially disposed in a separate opening 178. In one embodiment, each pair 119 of bearings is at least partially disposed within a respective opening 178. Each bearing includes a respective outer circumferential surface 142. In one embodiment, each respective outer circumferential surface is at an acute angle with respect to a surface of the through-bore. For example, surfaces 142A and 142B are at acute angles 184A and 184B, respectively, with respect to surface 182. In one embodiment, respective angles 184 for a pair of bearings, such as pairs 119A and 119B, are equal. In one embodiment, respective angles 184 for all the bearings in system 100 are equal. Respective outer circumferential surfaces 142 for a pair of bearings are aligned at an angle greater than zero degrees with respect to each other, for example, the surfaces form a "vee." In one embodiment, respective outer circumferential surfaces 142 for a pair of bearings are orthogonal with respect to each other.

In one embodiment, the respective pluralities of bearings 116 and 117 include three bearings each. However, it should be understood that pluralities of bearings 116 and 117 are not limited to particular respective numbers bearings. In one embodiment, plurality of protrusions 193 includes three protrusions. However, it should be understood that plurality of protrusions 193 is not limited to a particular number of protrusions.

In general, hose 122 is a high pressure hose, although any hose known in the art can be used for hose 122. For example, the high pressure hose can be a synthetic elastomer or flexible metal tube, surrounded by one or more layers of spiral or braided wire or tensile fiber, covered by elastomer or protective braid or fabric. In one embodiment, the hose has a pressure rating between 3,000 psi and 40,000 psi. In one embodiment, an internal diameter of the hose ranges from 4 mm to 50 mm. In one embodiment, the coil is alloy steel material. In one embodiment, the coil is round wire, hard drawn and formed into a helix by conventional spring fabrication methods. Of course there may be further variation in materials, sizes, and shapes used in the hose and coil.

In one embodiment, a rigid tube or pipe is used in the hose assembly in place of a flexible hose.

Actuator 110 can be any actuator known in the art. In one embodiment, actuator 110 is any pneumatic motor known in the art. Any means known in the art can be used to rotate the tractor element via actuator 110. In one embodiment, system 100 includes rotation element 186 rotationally fixed to the tractor element, that is, the tractor element and element 186 rotate together. Element 186 may be axially displaceable with respect to the tractor element, for example, to facilitate installation of the element on the tractor element. In one embodiment, the system includes connection element 188 and the actuator 106 includes drive element 190. In one embodiment, element 188 is a belt; however, it should be understood that any connection element known in the art, for example, a chain, can be used. Element 188 rotationally connects elements 186 and element 190, so that rotation of element 190 is transferred to element 186, causing the rotation described supra of tractor element 106. Any means known in the art can be used to axially fix the tractor element and facilitate the rotation of the tractor element. In one embodiment, bearings 192 are used to axially fix the tractor element and facilitate the rotation of the tractor element.

Any effector, or attachment, known in the art can be used with fitting 123, including, but not limited to nozzles, cutting edges, centralizers, augers, and offset sliding nozzles.

In one embodiment, the tractor element is rotationally fixed and the hose is rotated such that the interaction of the rotating hose with the protrusions in the through-bore causes axial displacement of the hose assembly. For example, the rotation of the hose assembly brings the coil into contact the protrusions generating the displacement forces described above.

In one embodiment, the tractor element is rotated as described above to axially displace the hose assembly and the hose assembly is rotated by a means separate from the tractor element. In one embodiment, the means for rotating the hose assembly is a swivel or rotary coupling as is known in the art. The swivel or rotary coupling can be driven by any means known in the art, including, but not limited to: manually, pneumatically, hydraulically, or electrically. In one embodiment, a gearbox is used, for example, with the swivel or rotary coupling, to obtain a desired rotation rate and torque for the hose assembly.

Advantageously, rotation of the hose assembly can eliminate the need for a rotating attachment. For example, to clean the inside surfaces of a pipe, an attachment with fixed (non-rotating) water jets can be attached to the hose assembly and the hose assembly can be rotated to provide the desired coverage of the inside surfaces by the fixed jets. Further, rotation of the hose assembly can be controlled to provide partial or intermittent rotation, for example, to avoid jets hitting unwanted areas, to orient side thrust of jets to navigate elbows or resist gravity, or to actuate mechanical components in the space being accessed.

Advantageously, axial displacement and rotation of the hose assembly increases the manipulation possible for an attachment on the end of the hose assembly, for example, attached to fitting 123. For example, the axial displacement and rotation enable the attachment to operate in a larger variety of patterns in a larger variety of spaces and to reach a larger number of surfaces in those spaces. Thus, a hose tractor used in conjunction with hose rotation can be used to remotely manipulate tools on the end of the hose to perform operations on a larger variety of spaces and surfaces.

The following is a description of a method for propelling a hose. Although the method is depicted as a sequence for clarity, no order should be inferred from the sequence unless explicitly stated. The following should be viewed in light of FIGS. 2-11. A first step axially fixes a tractor element, for example, element 106, within a first housing, for example, housing 104. A second step places a hose assembly, for example, assembly 108, including a hose, for example, hose 122, and a substantially helical coil, for example, coil 120, disposed about the hose, in a through-bore for the tractor element, for example, through-bore 114. A third step contacts a first portion of the coil, for example, portion 120A, with a first protrusion, for example, bearing 116A, or protrusions 193 or 194, disposed in a second housing for the tractor element, for example, housing 112. The first protrusion is partially disposed within the through-bore. A fourth step rotates the tractor element in a first rotational direction. A fifth step exerts, using the first protrusion, a first displacement force on the coil. A sixth step reacts the coil to the first displacement force. A seventh step displaces the hose assembly in a first axial direction, for example, direction 126.

In one embodiment, one step contacts a second portion of the coil, for example, portion 120C, with a second protrusion, for example, bearing 117A, or protrusions 193 or 194, partially disposed within the through-bore; another step rotates the tractor element in a second rotational direction, for example, direction 128, opposite the first rotational direction; a further step exerts, using the second protrusion, a second displacement force on the coil; yet another step reacts the coil to the second displacement force; and a still further step displaces the hose assembly in a second axial direction, for example, direction 130, opposite the first axial direction.

In one embodiment, one step connects an end of a fitting, for example, fitting 123, to the hose; another step inserts an end of the coil through an opening for a groove, for example, groove 164, on the fitting; and a further step displaces the coil through the groove about the hose.

In one embodiment, a first step connects a longitudinal end of a fitting, for example, fitting 123, to the hose; a second step expands the coil to increase an inside diameter of the coil; a third step passes the coil over the fitting and about the hose, or inserts the hose in the coil; a fourth step disposes a portion of the coil in the groove; a fifth step releases the coil so that the inside diameter of the coil decreases; and a sixth step engages the coil with an end wall for the groove, for example, end wall 174. In one embodiment, one step compressively engages the coil with the hose.

The following is a description of a method of assembling a hose and a coil. Although the method is depicted as a sequence for clarity, no order should be inferred from the sequence unless explicitly stated. The following should be viewed in light of FIGS. 2-11. For a helical coil, for example, coil 120, having a first inner radius in a relaxed state, one step expands the helical coil so that the helical coil has a second inner radius greater than the first inner radius; a second step inserts, within the helical coil, a hose, for example, hose 122, having a first outer radius greater than the first inner radius and no greater than the second inner radius, or places the coil about the hose; and a further step releases the expansion of the helical coil so that the helical coil compressively engages the hose.

In one embodiment, a step inserts an end of the coil through an opening at a distal end of a fitting, for example, fitting 123; and another step displaces the coil through the groove onto the hose. In one embodiment, a step blocks the helical groove at the distal end after the coil has been passed through the groove. In one embodiment, one step passes the coil over the fitting, or inserts the hose in the coil; another step disposes a portion of the coil in the groove; and a further step engages the coil with an end wall, for example, end wall 174, at an end of the fitting opposite the distal end.

The following is a description of a method of assembling a hose, coil, and fitting. Although the method is depicted as a sequence for clarity, no order should be inferred from the sequence unless explicitly stated. The following should be viewed in light of FIGS. 2-11. One step attaches a first end of a fitting, for example, fitting 123, to an end of a hose, for example, hose 122. The hose includes a first outer radius. The fitting includes: a longitudinal axis; a distal end longitudinally opposite the first end; an outer surface with a second outer radius; and a substantially helical groove, for example, groove 164, in the outer surface. The groove includes a first opening in communication with the distal end, and a bottom surface at a radial distance, for example distance 172, from the longitudinal axis. The second outer radius is greater than the first outer radius; and the first outer radius is no greater than the radial distance. Another step inserts an end of the coil through the second opening and into the groove, the coil having an inner radius no less than the first outer radius; and a further step displaces the coil through the groove onto the hose.

The following is a description of a method of assembling a hose, coil, and fitting. Although the method is depicted as a sequence for clarity, no order should be inferred from the sequence unless explicitly stated. The following should be viewed in light of FIGS. 2-11. A first step attaches a first end of a fitting, for example, fitting 123, to an end of a hose, for example, hose 122. The fitting includes a distal end longitudinally opposite the first end; an outer surface; and a substantially helical groove, for example, groove 164, in the outer surface. The groove includes an end wall, for example, end wall 174, at the first end. A second step expands the coil to increase an inside diameter of the coil; a third step passes the coil over the fitting and about the hose, or inserts the hose in the coil; a fourth step releases the coil so that the inside diameter of the coil decreases; a fifth step disposes a portion of the coil in the groove; and a sixth step engages the coil with the end wall. In one embodiment, one step compressively engages the coil with the hose.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for axially propelling a hose, comprising:
   a system housing;
   a tractor element disposed in the system housing and including:
      a tractor housing with a through-bore; and,
      a first protrusion roller rotatably fastened to the tractor housing at a non-perpendicular angle with respect to the axial through bore and extending through the tractor housing into the through-bore;
      a hose assembly including a substantially helical coil disposed about a hose;
   a second protrusion roller rotatably fastened to the tractor housing circumferentially adjacent the first protrusion roller at a non-perpendicular angle with respect to a first direction along the axial through bore and at a different angle than the fastened angle of the first protrusion roller with respect to the first direction along the axial through bore and extending through the tractor housing into the through-bore, wherein adjacent first and second protrusion rollers extend through a common opening in the tractor housing, and wherein:
the hose assembly can be disposed in the through-bore so that the second protrusion roller contacts a second flank portion of the coil different from the first flank portion of the coil;
as the tractor housing is rotated by the actuator in a second rotational direction, opposite the first rotational direction:
the second protrusion roller exerts a second displacement force on the coil;
the hose assembly reacts to the second displacement force by displacing in a second axial direction opposite the first axial direction; and,
an actuator within the system housing mounted adjacent the tractor housing for rotating the tractor housing with respect to the system housing, wherein:
the tractor element is fixed in the system housing with respect to axial movement;
the hose assembly can be disposed in the through-bore so that the first protrusion roller contacts only a first flank portion of the coil; and,
as the tractor housing is rotated by the actuator in a first rotational direction:
the first protrusion roller rolls along the first flank portion of the coil and exerts a first displacement force on the coil; and,
the hose assembly reacts to the first displacement force by displacing in a first axial direction.

2. The system of claim 1, wherein:
the tractor element includes an axis of rotation;
a portion the first protrusion roller, located closest to the axis of rotation, is at a radial distance from the axis of rotation;
the coil includes an outer radius; and,
the outer radius is greater than the radial distance.

3. The system of claim 1, wherein the coil is in contact with the hose.

4. The system of claim 3, wherein the coil is in compressive engagement with the hose.

5. The system of claim 1, wherein:
the hose has a first outer surface with a first outer radius;
the hose assembly includes a fitting with:
a longitudinal axis;
a first end connected to the hose;
a distal end longitudinally opposite the first end;
a second outer surface with a second outer radius; and,
a substantially helical groove in the second outer surface;
the helical groove is open to the first and distal ends;
the groove includes a bottom surface at a radial distance from the longitudinal axis;
the second outer radius is greater than the first outer radius; and,
the first outer radius is no greater than the radial distance.

6. The system of claim 5, wherein:
the coil, in a relaxed state, has an inner radius no greater than the first outer radius; and,
the coil is displaceable through the groove onto the hose while the fitting is fixed to the hose.

7. The system of claim 6, wherein the inner radius is less than the first outer radius.

8. The system of claim 1, wherein:
the hose assembly includes a fitting with:
a first end connected to the hose;
an outer surface; and,
a substantially helical groove in the outer surface;
the helical groove includes an end wall at the first end;
the coil is engaged with the end wall; and,
a portion of the coil is disposed in the groove.

9. A system for axially propelling a hose, comprising:
a system housing;
a tractor element disposed in the system housing and including:
a tractor housing rotatably supported in the system housing for rotation of the tractor housing about an axis through the tractor housing, the tractor housing having an axial through-bore;
a first protrusion roller rotatably fastened to the tractor housing at a non-perpendicular angle with respect to a first direction along the axial through bore and extending through the tractor housing into the through-bore;
a second protrusion roller circumferentially adjacent to the first protrusion roller rotatably fastened to the tractor housing at a non-perpendicular angle with respect to the axial through bore and at a different angle with respect to the first direction along the axial through bore than the fastened angle of the first protrusion roller, the second protrusion roller extending through the tractor housing into the through-bore, wherein adjacent first and second protrusion rollers are a pair that extends through a common opening in the tractor housing;
a hose assembly configured to extend into the through-bore, wherein the hose assembly has a helical coil disposed about a hose; and,
as the tractor housing is rotated by an actuator in a first rotational direction about the axis:
the first protrusion roller rolls along a first flank portion of the coil and exerts a first displacement force on the coil; and,
the hose assembly reacts to the first displacement force by displacing in a first axial direction;
as the tractor housing is rotated by the actuator in a second rotational direction opposite the first rotational direction, the second protrusion roller rolls along a second flank portion of the coil different from and circumferentially spaced from the first flank portion of the coil and exerts a second axial displacement force on the coil.

10. An apparatus for axially propelling a coil clad hose assembly having a substantially helical metal wire coil disposed about a high pressure hose, the apparatus comprising:
an outer housing;
a cylindrical tractor element disposed in the housing, wherein the cylindrical tractor element includes:
a rotatable cylindrical tractor housing with a through bore for receiving the coil clad hose assembly therein; and
a plurality of axially spaced pairs of first and second protrusion rollers rotatably fastened to the tractor housing, each protrusion roller extending through the tractor housing into the through bore, wherein the first protrusion rollers are each fastened at non-perpendicular angles with respect to a first direction along the axial through bore and the second protrusion rollers are each fastened at different non-perpendicular angles with respect to the first direction along the axial through bore and wherein each second protrusion roller is circumferentially spaced from and adjacent one of the first protrusion rollers so as to engage different flank portions of the coil on the hose when the coil clad hose assembly is inserted into the through bore, and wherein each pair extends through a common opening into the tractor housing; and an actuator within the outer housing mounted adjacent the cylindrical tractor housing for rotating the tractor housing with respect to the outer housing to drive the coil clad hose assembly axially through the cylindrical tractor housing.

11. The apparatus of claim 10 wherein the actuator includes a pneumatic motor and a drive element connected between the motor and the cylindrical tractor housing.

12. The apparatus of claim 11 wherein the drive element is a belt.

13. The apparatus of claim 10 wherein the outer housing encloses the actuator and tractor element.

14. An apparatus for axially propelling a coil clad hose assembly having a substantially helical metal wire coil disposed about a high pressure hose, the apparatus comprising:
   a rotatable cylindrical tractor housing with a through bore for receiving the coil clad hose assembly therein; and
   a plurality of axially spaced pairs of first and second protrusion rollers rotatably fastened to the tractor housing, each protrusion roller extending through the tractor housing into the through bore, wherein the first protrusion rollers are each fastened at non-perpendicular angles with respect to a first direction along the axial through bore and the second protrusion rollers are each fastened at different non-perpendicular angles with respect to the first direction along the axial through bore, wherein each second protrusion roller is circumferentially spaced from and adjacent one of the first protrusion rollers so as to engage different flank portions of the coil on the hose when the coil clad hose assembly is inserted into the through bore, and wherein each pair extends through a common opening into the tractor housing.

15. The apparatus according to claim 14 further comprising an outer housing containing the rotatable cylindrical tractor housing.

16. The apparatus according to claim 14 further comprising an actuator adjacent the cylindrical tractor housing for rotating the tractor housing to drive the coil clad hose assembly axially through the cylindrical tractor housing.

17. The apparatus according to claim 16 further comprising an outer housing containing the rotatable cylindrical tractor housing and the actuator.

* * * * *

UNITED STATES PATENT AND TRADEMARK OFFICE
CERTIFICATE OF CORRECTION

| | |
|---|---|
| PATENT NO. | : 8,887,343 B2 |
| APPLICATION NO. | : 12/723410 |
| DATED | : November 18, 2014 |
| INVENTOR(S) | : Zink |

It is certified that error appears in the above-identified patent and that said Letters Patent is hereby corrected as shown below:

In the specification

In Column 10, Line 16, delete "actuator 106" and insert -- actuator 110 --, therefor.

Signed and Sealed this
Fifth Day of May, 2015

Michelle K. Lee
*Director of the United States Patent and Trademark Office*